2 Sheets—Sheet 1.

G. SUMMERTON.
Middlings Scourer and Purifier.

No. 221,751. Patented Nov. 18, 1879.

WITNESSES
Frank A. Brooks
Geo. H. Strong

INVENTOR
Geo. Summerton
By Dewey & Co.
Attys

2 Sheets—Sheet 2.

G. SUMMERTON.
Middlings Scourer and Purifier.

No. 221,751.  Patented Nov. 18, 1879.

WITNESSES
Frank N. Brooks
Geo. H. Strong.

INVENTOR
Geo. Summerton
By Dewey & Co.
Atty

UNITED STATES PATENT OFFICE.

GEORGE SUMMERTON, OF SAN FRANCISCO, CALIFORNIA.

IMPROVEMENT IN MIDDLINGS SCOURERS AND PURIFIERS.

Specification forming part of Letters Patent No. 221,751, dated November 18, 1879; application filed August 25, 1879.

*To all whom it may concern:*

Be it known that I, GEORGE SUMMERTON, of the city and county of San Francisco, and State of California, have invented a Middlings Scourer and Purifier; and I hereby declare the following to be a full, clear, and exact description thereof.

The object of my invention is to remove from middlings, bran, &c., the fuzzy or fibrous foreign substance which usually clings to it, so as to thoroughly purify the middlings. To accomplish this I mount a series of corrugated tables, one above another, in a cylinder or case, at the top of which is a peculiarly-constructed propeller-shaped fan for inducing an air current or blast.

In the center of the cylinder is a series of vertical circular diaphragms, corresponding in number to the number of tables, in the bottom of which are arranged circular rows of brushes which may be kept in contact with the tables, these brushes scouring or scrubbing the middlings on the tables so as to separate the light material which is drawn off by the air-current. These diaphragms also answer the purpose of air-tubes for directing the blast. Suitable arrangements are made for controlling the feed of material, for regulating the blast of air, and for adjusting the scrub of the brushes, as is more fully described in the accompanying drawings, in which—

Figure 1:
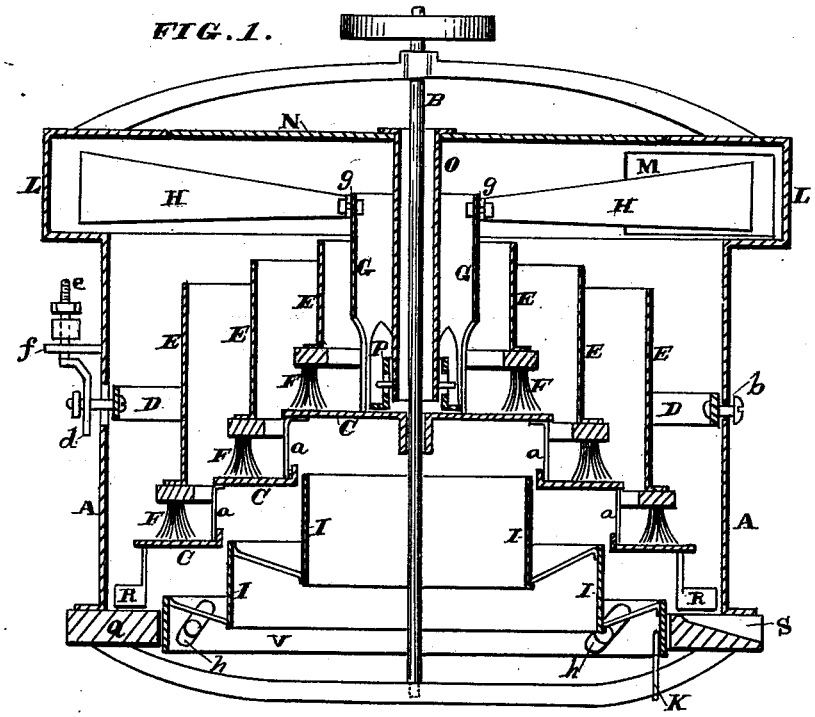
Figure 2:
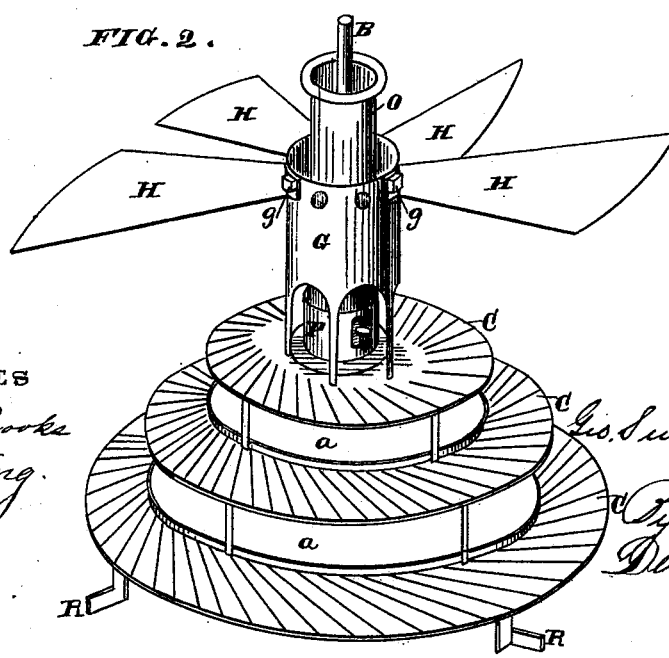
Figure 3:
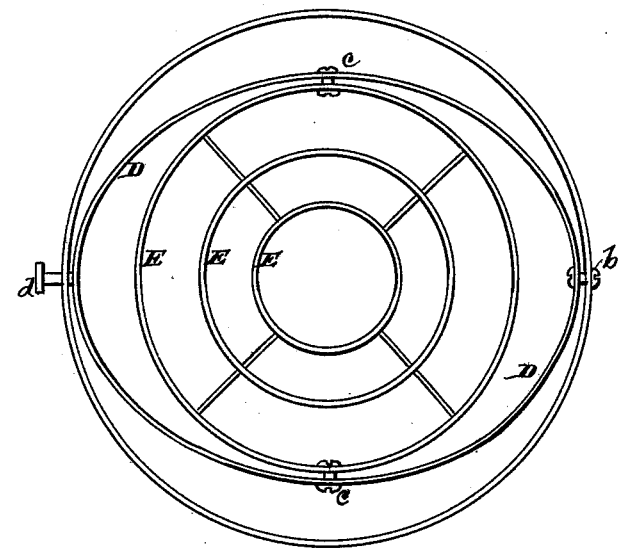
Figure 4:
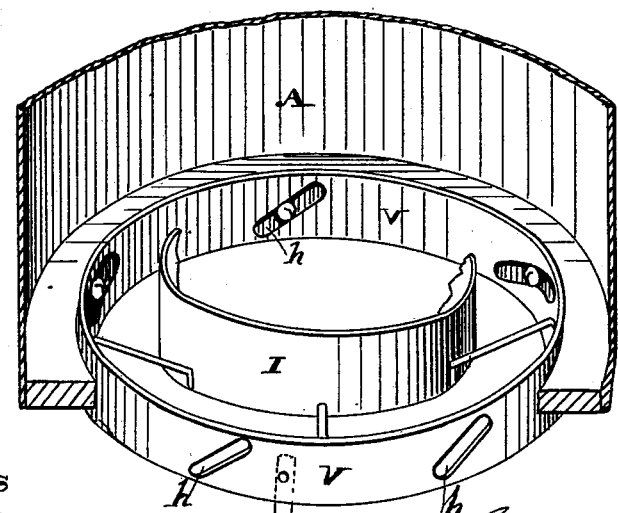

Figure 1 is a vertical section. Fig. 2 is a perspective view of the fans and tables. Fig. 3 is a horizontal view of the diaphragms, showing the method of suspension. Fig. 4 is a sectional perspective of the sliding plate V.

In the ordinary machines for purifying middlings, difficulty is experienced in removing a peculiar fuzzy substance with which the middlings are intermingled. This substance seems to cling to the middlings in such a manner that it is not removed by an ordinary air-blast, and can only be thoroughly removed by rubbing. It is not desirable to regrind this fuzz or light substance, and I have therefore devised a means of scrubbing the substance under treatment so as to remove the fuzz or light material from the middlings and blow it away, thus separating the valuable material from the dross.

A cylinder, A, open at the bottom, is provided, down through the center of which is placed the vertical driving-shaft B, as shown, this shaft fitting in a step at the bottom. To this shaft are secured three or more circular tables, c, which rotate with it and which are corrugated in the same manner as millstones. These tables are arranged in a series of steps, one above the other, the upper one being the smallest, and each succeeding lower one being of an increased diameter, so that the material falling over the outer edge of one will fall onto the inner edge of the next. A space, $a$, is left between each table and the adjoining one for the purpose hereinafter described.

A ring, D, is swiveled at opposite sides of the inner part of this cylinder, as shown at $b$, and in this is hung on swivels $c$ a series of three or more vertical rings or encircling annular diaphragms, E, one over each revolving table, as shown. These circular diaphragms correspond in diameter to the respective tables over which they are placed, and on the lower edge of each diaphragm or ring is placed a circle of brushes, F, as shown, said brushes being in close contact with the revolving table at their outer edges. The diaphragms being swiveled in the ring D, and said ring being oppositely swiveled to the inner part of the cylinder, the diaphragms admit of a universal motion, so that the brushes will always remain at any specified distance from the tables in any position. One of the swivels of the ring D projects through the side of the cylinder and is secured in a plate, $d$, provided with a bolt and set-screw, $e$, which extends through a lug, $f$, on the outside of the cylinder. By turning the screw on the bolt the plate carrying the swivel may be raised or lowered, thus raising or lowering the ring D and lifting or lowering the circular diaphragms with the brushes. By this means the brushes may be kept in close contact with the revolving tables, or raised above them, as desired, and the amount of scrub or rub of the middlings may be regulated.

Each of the vertical rings or circular diaphragms forms an air-tube, and through the spaces between them a constant current of air is rising from below and passing out of the machine. To induce this air-current I secure to the upper table, which is fastened to the revolving shaft, a hollow central hub, G, raised above the table, as shown. In the upper end of this hub is formed a series of holes, through which are placed screw-bolts $g$, having fans or propeller-blades H attached to them, as shown. A series of these blades is provided, so that when all are in place a propeller-shaped fan is formed. The fans may be set at greater or less angles, as desired, by means of these bolts or nuts, so as to create more or less draft, as desired. This form of fan insures an equal draft from each table, and the suction will be perfectly regular, which is not the case when a suction-blower is placed outside the cylinder.

Around the lower part of the cylinder is placed a sliding ring or circular plate, V, having rigidly attached to it, by means of rods, three or more vertical rings or blast-regulators, I, corresponding in size and number to the size and number of tables. One of these rings fits under each table and inside of it, as shown. Diagonal slots $h$ are cut in the sliding plate V, and bolts passing through these slots secure the ring to the frame of the cylinder. Lugs $k$ are made on the sliding ring, by which it may be moved.

By taking hold of the lugs and moving the ring one way or the other, the bolts in the diagonal slots cause it to be raised or lowered. This action will raise or lower the vertical rings I, so as to regulate the size of the openings or spaces $a$ and allow more or less air to come through, according to the necessities of the class of material under treatment.

The propeller-fan revolves at the top of the cylinder, and a casing, L, is provided, in which it may move, this casing having an outlet, M, through which the fuzz and other light substances are blown by the propeller. This casing is made in the form of a scroll, as shown. Fitting in the top of this casing is a cover, N, through which passes a feed-tube, O. At the lower end of this feed-tube is a loose flanged sleeve or ring, P, having slots formed in its sides, through which projects lugs formed on the feed-tube. The loose flanged ring rests on the upper table, for the purpose hereinafter described.

In operating my device, the middlings are fed down from a spout through the feed-tube O. The loose ring at the bottom of this feed-tube rests on the revolving table, and as the material comes down it passes out under this ring onto the table; but the ring prevents the downward passage of any air-current superinduced by the revolving fan. This ring adjusts itself automatically in proportion to the amount of the stuff fed down, and as more or less material moves up or down, as required, the feed is thus self-adjusting.

When the material reaches the first revolving table the corrugations direct it by centrifugal action to the outer edge of the revolving table. Here the stationary brushes on the diaphragm meet it, and the material is scrubbed or scoured by the brushes, whereby the clinging fuzz is removed and separated from the middlings. The separated material falls over the edge of the table down toward the next. In falling it meets the upward current of air coming through the space $a$, which current drives the fuzz and lighter substances up through the hole formed by the inner vertical diaphragm, E, whence it passes off out of the cylinder through the outlet M. The heavier material is again rubbed on the next table, and again passes through the air-current, where a further separation takes place, the operation being repeated, and in accordance with the number of the revolving tables.

If there is too much of an air-current the pitch of the fans may be changed, as described, or the regulating-plates I may be raised or lowered to cut off the air-supply or increase the spaces $a$.

The brushes may be removed and replaced at any time it may become necessary. As the valuable material goes past the lower table onto the base or bottom, Q, of the cylinder, small sweeps R attached to the lower revolving table pass it around the base to the discharge-pipe S, where it may be passed off.

The rubbing action of the brushes is such as to remove all the foreign substance clinging to the middlings, bran, or other material under treatment, and the air-current carries this dross upward, while the heavy stuff goes in its opposite direction.

Bristles or fibrous substance may be used for brushes, the idea being to pass the material under yielding scrubbers, so as to remove the clinging fuzz and light substance.

The air-current may be regulated while the machine is in motion by means of the sliding ring V, with its regulating-rings, as the sizes of the spaces $a$ between the tables is enlarged or decreased, as described, at will.

To create a permanent current of specified speed, the machine is stopped and the pitch of the fans regulated.

Having thus described my invention, what I claim as new, and desire to secure by Letters Patent, is—

1. The corrugated tables C, arranged to rotate in a horizontal plane inside the cylinder A, and placed in a series of steps one above the other, in combination with the stationary brushes F, mounted on rings or diaphragms E, whereby the material falling onto said tables is scoured or rubbed, and the fuzz or fibrous foreign substances separated from the valuable portion, substantially as herein described.

2. The vertical circular diaphragms E, carrying the brushes F, in combination with the swiveled ring D, said ring being provided with a plate, $d$, and set-screw $e$, whereby the brushes are regulated, substantially as herein described.

3. The vertical rings or diaphragms E, carrying the brushes F, arranged above the revolving corrugated tables C, said tables having the space $a$ between them, in combination with the propeller-shaped fan, consisting of the hollow hub G, with the adjustable blades H, whereby the light material separated by the brushes is directed by the blast and diaphragms upward to the discharge-spout M, and separated from the middlings which fall below, substantially as herein described.

4. The revolving propeller-shaped fan or air-suction device, consisting of the hollow hub G, connected with the shaft B, and provided with the blades H, having the adjusting bolts $g$, said fan being mounted above the revolving tables C, and scouring brushes F, for the purpose of inducing a current of air to remove the fibrous and fuzzy light substances after they are released by the brushes, substantially as herein described.

5. The adjustable annular diaphragms or air-tubes E, carrying the brushes F, and arranged serially above the tables C, so as to connect with the air-spaces $a$, in combination with the adjustable rotating fan H, whereby the light particles separated on each separate table are directed to a common outlet, M, substantially as herein described.

6. In combination with the rotating tables C, on which the middlings are scoured or brushed, said tables being separated by the air-spaces $a$ leading into the tubes or diaphragms E, through which an air current is induced by the rotating fan H, the circular diagonally-sliding plate V, with its draft-regulators I fitting in the spaces $a$ between the tables, whereby the blast or current of air is regulated while the tables are in motion, substantially as herein described.

7. In combination with the stationary brush-carrying and blast-directing diaphragms E, placed above the series or steps of revolving tables C, between which are the spaces $a$, the adjustable fan-blades H, moving in the casing L, and the adjusting-plate V, with its regulators I, whereby either a permanent or temporary adjustment of the blast is accomplished, substantially as herein described.

8. In combination with the revolving tables C, moving in an inclosed cylinder, A, through which an air current or blast is passed, the loose flanged sleeve or ring P, sliding on the lower end of the feed-tube O, said ring resting on the upper table, as shown, whereby the feed is automatically adjusted, and the passage of an air-current through the feed-tube is prevented, substantially as herein described.

In witness whereof I have hereunto set my hand.

GEORGE SUMMERTON.

Witnesses:
  CHAS. G. YALE,
  FRANK A. BROOKS.